United States Patent
Fore et al.

(10) Patent No.: US 7,051,140 B2
(45) Date of Patent: May 23, 2006

(54) CONNECTOR THAT ENABLES AGGREGATION OF INDEPENDENT SYSTEM RESOURCES ACROSS PCI/PCI-X BUS AND INTERLOCKED METHOD FOR AGGREGATING INDEPENDENT SYSTEM RESOURCES ACROSS PCI/PCI-X BUS

(75) Inventors: Richard C. Fore, Apex, NC (US); Timothy Lee, Cary, NC (US); Mark E. Andresen, Cary, NC (US); David E. Vieira, Raleigh, NC (US); Andrew B. McNeill, Jr., Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 10/293,860

(22) Filed: Nov. 13, 2002

(65) Prior Publication Data

US 2004/0093451 A1 May 13, 2004

(51) Int. Cl.
*G06F 13/00* (2006.01)
(52) U.S. Cl. ..................... 710/301; 710/302
(58) Field of Classification Search ............... 710/301, 710/302
See application file for complete search history.

(56) References Cited

U.S. PATENT DOCUMENTS

| | | | | |
|---|---|---|---|---|
| 5,590,377 A | * | 12/1996 | Smith | 710/22 |
| 5,673,400 A | * | 9/1997 | Kenny | 710/306 |
| 5,721,838 A | | 2/1998 | Takahashi et al. | |
| 5,737,524 A | * | 4/1998 | Cohen et al. | 710/301 |
| 5,787,261 A | | 7/1998 | Osaka et al. | |
| 5,815,647 A | * | 9/1998 | Buckland et al. | 714/3 |

(Continued)

OTHER PUBLICATIONS

PCI Local Bus Specification—Revision 2.0—Apr. 30, 1993—Sections 2.2.1, 2.2.6, and 3.6.4.*
"Record Display," Software Patent Institute Database of Software Technologies, Record 1, IBM Corporation, Nov. 2001, pp. 1-3.
"Record Display," Software Patent Institute Database of Software Technologies, Record 2, IBM Corporation, Nov. 2001, pp. 1-3.

(Continued)

*Primary Examiner*—Rehana Perveen
*Assistant Examiner*—Jeremy S. Cerullo
(74) *Attorney, Agent, or Firm*—Sawyer Law Group LLP

(57) ABSTRACT

The peripheral bus connector for improved aggregation of resources of a device on the peripheral bus includes a plurality of aggregation pins, in addition to the pins according to the peripheral bus standard. Signals from a controller on an extended peripheral bus adapter sends and receives signals in addition to standard signals of the peripheral bus through the aggregation pins. The aggregated device is hidden from third parties, and its existence is known only to the controller on the extended peripheral bus adapter. In this manner, resources are aggregated across a peripheral bus without needing the addition of another controller and without the need to redefine standard peripheral bus signals. In addition, standard peripheral bus adapters may still be used in the connector if resource aggregation is not desired.

18 Claims, 5 Drawing Sheets

U.S. PATENT DOCUMENTS

| | | |
|---|---|---|
| 5,948,090 A | 9/1999 | Heinrich et al. |
| 6,038,624 A | 3/2000 | Chan et al. |
| 6,061,752 A | 5/2000 | Jones et al. |
| 6,092,134 A | 7/2000 | Chun et al. |
| 6,192,437 B1 | 2/2001 | Oka et al. |
| 6,199,130 B1 | 3/2001 | Berglund et al. |
| 6,212,586 B1 | 4/2001 | Mros et al. |
| 6,266,252 B1 | 7/2001 | Karabatsos |
| 6,269,416 B1 | 7/2001 | Meier et al. |
| 6,295,565 B1 | 9/2001 | Lee |
| 6,598,109 B1 * | 7/2003 | McAlister et al. .......... 710/306 |

OTHER PUBLICATIONS

"Record Display," Software Patent Institute Database of Software Technologies, Record 2, IBM Corporation, Nov. 2001, pp. 1-2.

"PCI-X to Dual Channel Ultra 320 SCSI Controller," LSI Logic Corporation, 2001, pp. 1-4.

"MROMB Design Considerations Using the Intel® 80303 I/O Processor," Intel, Sep. 2001, pp. 1-15.

* cited by examiner

CONNECTOR THAT ENABLES AGGREGATION OF INDEPENDENT SYSTEM RESOURCES ACROSS PCI/PCI-X BUS AND INTERLOCKED METHOD FOR AGGREGATING INDEPENDENT SYSTEM RESOURCES ACROSS PCI/PCI-X BUS

FIELD OF THE INVENTION

The present invention relates to peripheral buses, and more particularly to the aggregation of resources of devices connected to peripheral buses.

BACKGROUND OF THE INVENTION

FIG. 1 illustrates a conventional peripheral bus architecture. A plurality of devices communicates via the peripheral bus 100 according to a standard, such as the Peripheral Component Interface (PCI) standard. The PCI standard is well known in the art. In this specification, "PCI" refers to both PCI and PCI-X bus standards. A host bridge 102 arbitrates access to the peripheral bus 100 for a plurality of peripheral bus-compliant devices and provides an access path between these devices and the host processor 120. A controller 112 on a peripheral bus adapter 110 couples to a peripheral bus connector 108 and accesses the bus 100 through the connector 108. The controller 112 manages the bus-compliant device 104 and its control circuit 106.

FIG. 2 illustrates the pins of a conventional peripheral bus connector. Assuming that the connector 108 is a PCI connector, it has a set of pins 202 for 32-bit transfers, and a set of extension pins 204 for 64-bit transfers.

Occasionally, it is desirable to extend the capabilities of the device 104. One manner of extending the capabilities is to upgrade from the device's controller 112 to a more advanced controller 118 on another peripheral bus adapter 116 coupled at another peripheral bus connector 114. However, this adds to the cost of the system since the original controller 112 typically sits idle once the new controller 116 is installed.

Another manner of extending the capabilities of the device 104 is to aggregate its resources using one controller 112 at one connector 108, but by redefining one or more of the signals that is standard for the peripheral bus 100. However, when the signals are redefined, the controller 112 and the connector 108 cease to function according to the standard, making the system less flexible.

Accordingly, there exists a need for improved aggregation of resources across a peripheral bus. The improved resource aggregation should allow the controller of the device to aggregate its resources without redefining standard signals. The present invention addresses such a need.

SUMMARY OF THE INVENTION

The peripheral bus connector for improved aggregation of resources of a device on the peripheral bus includes a plurality of aggregation pins, in addition to the pins according to the peripheral bus standard. Signals from a controller on an extended peripheral bus adapter sends and receives signals in addition to standard signals of the peripheral bus through the aggregation pins. The aggregated device is hidden from third parties, and its existence is known only to the controller on the extended peripheral bus adapter. In this manner, resources are aggregated across a peripheral bus without needing the addition of another controller and without the need to redefine standard peripheral bus signals.

In addition, standard peripheral bus adapters may still be used in the connector if resource aggregation is not desired.

DETAILED DESCRIPTION

The present invention provides an improved aggregation of resources across a peripheral bus. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 3 through 5 in conjunction with the discussion below.

Figure 1:
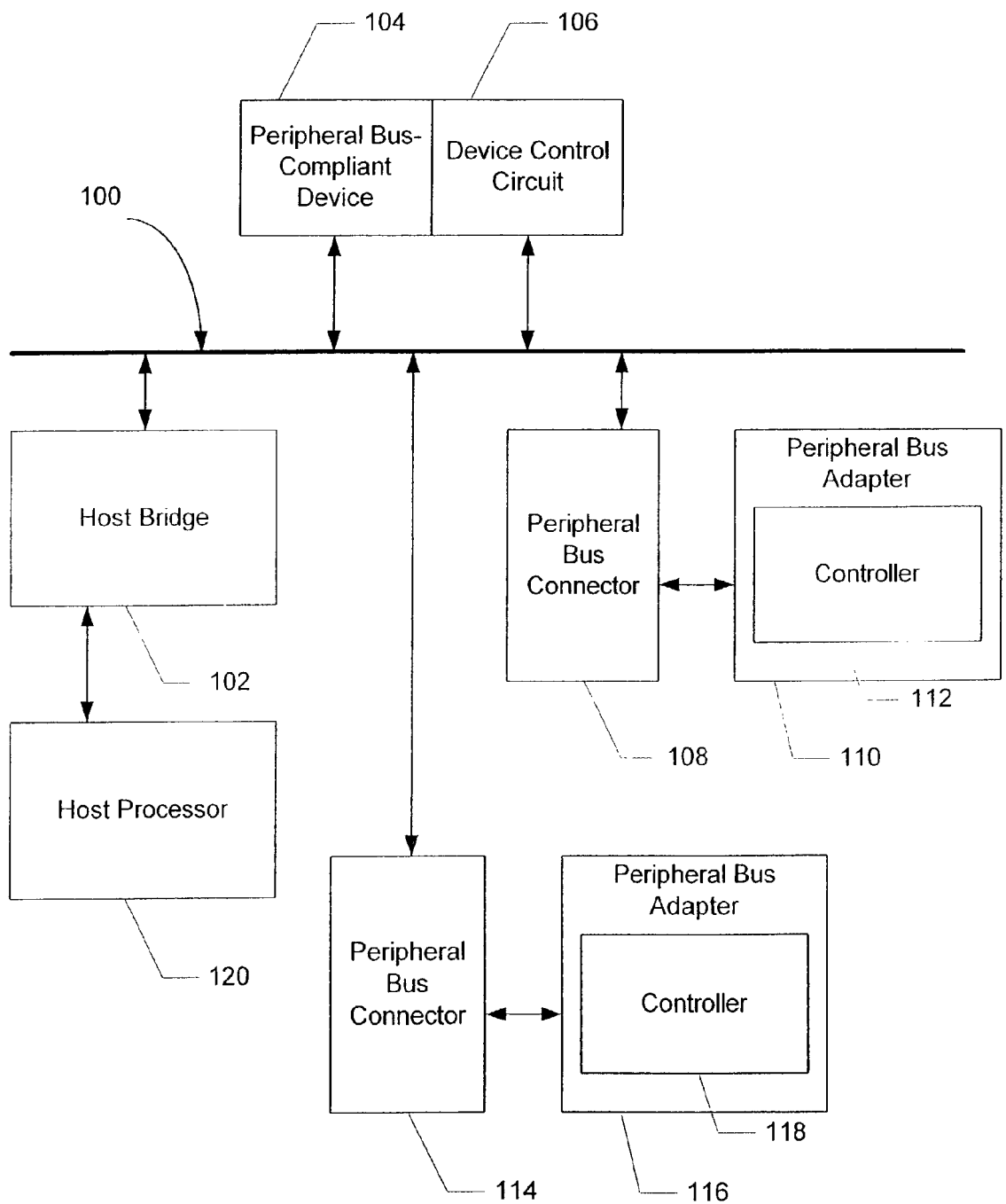
FIG. 1 illustrates a conventional peripheral bus architecture.
Figure 2:
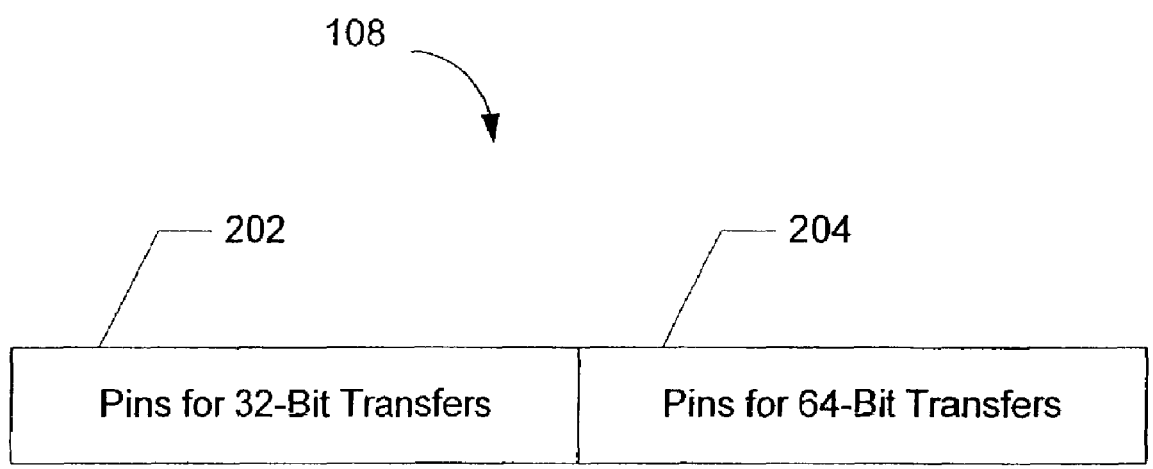
FIG. 2 illustrates the pins of a conventional peripheral bus connector.
Figure 3:
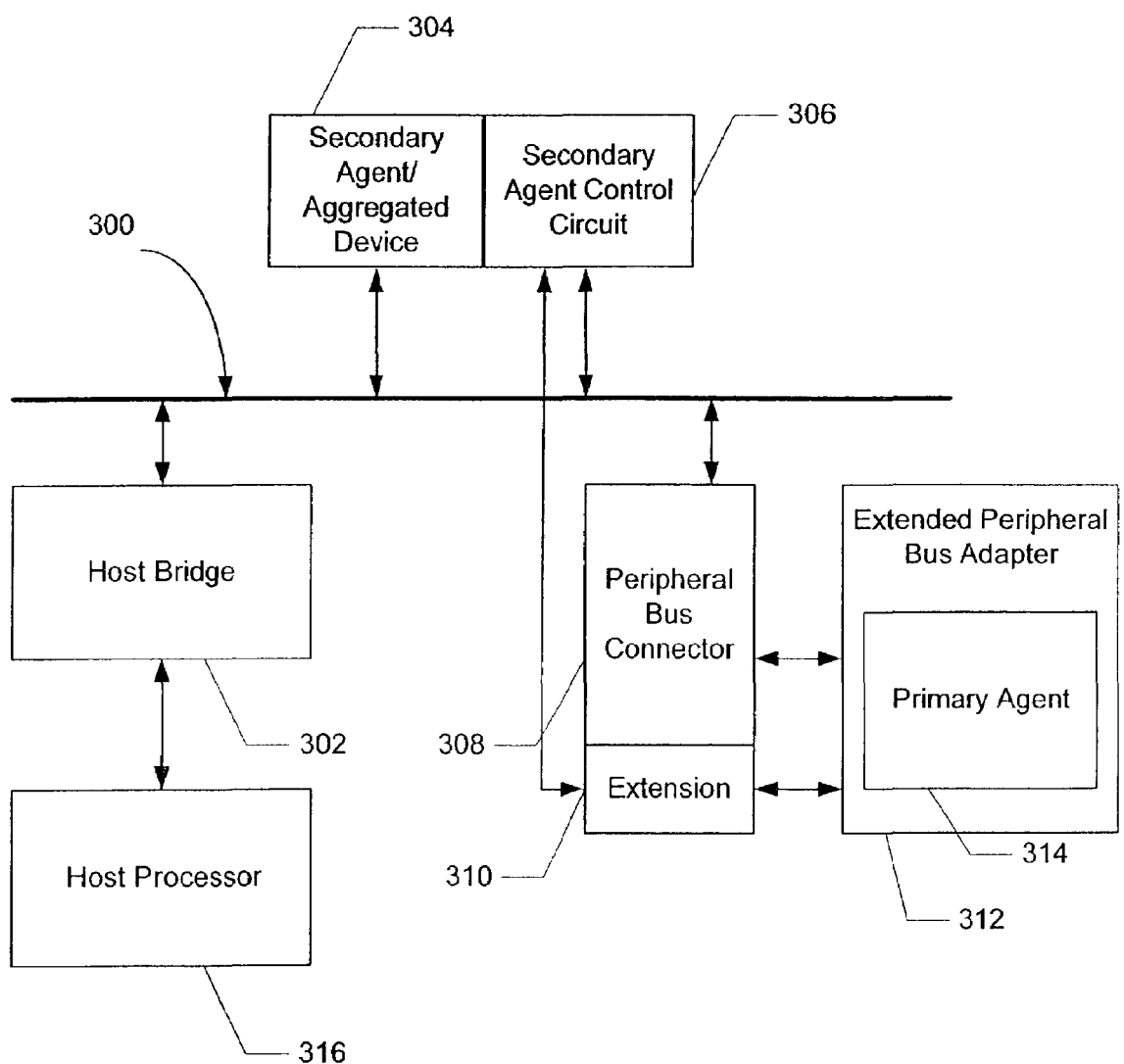
FIG. 3 illustrates a preferred embodiment of a peripheral bus architecture in accordance with the present invention.

FIG. 3 illustrates a preferred embodiment of a peripheral bus architecture in accordance with the present invention. A host bridge 302 arbitrates access to the peripheral bus 300. A primary agent 314, or controller, for an aggregated device 304 resides on an extended peripheral bus adapter 312 in accordance with the present invention. The extended peripheral bus adapter 312 comprises a connection (not shown) capable of coupling to a standard peripheral bus connector 308 that includes an extension 310 of pins.

Figure 4:
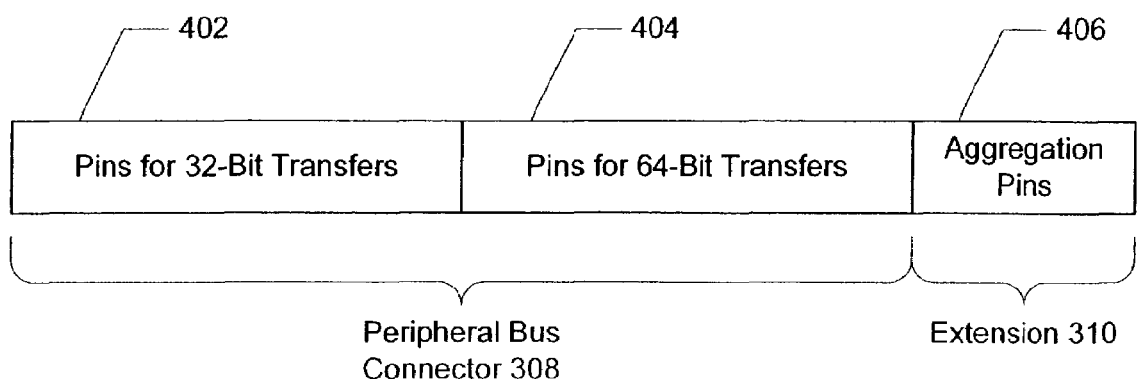
FIG. 4 illustrates a preferred embodiment of the pins for the extended peripheral bus connector and extension in accordance with the present invention.

FIG. 4 illustrates a preferred embodiment of the pins for the extended peripheral bus connector 308 and extension 310 in accordance with the present invention. As illustrated, the extended connector comprises pins 402 for 32-bit transfers, pins 404 for 64-bit transfers, and additional aggregation pins 406. The secondary agent control circuit 306 and the primary agent 314 communicate with each other both directly and via the peripheral bus 300. The primary agent 314 sends and receives standard signals for the peripheral bus 300 through the pins 402 and 404. Additional signals are sent and received through the aggregation pins 406, as described below. These additional signals allow the resources of the secondary agent 304 to be aggregated without redefining the standard peripheral bus signals. Also, a standard peripheral bus adapter may still be used in the extended peripheral bus connector 308 if resource aggregation is not desired.

In the preferred embodiment, the peripheral bus 300 is a PCI bus which functions according to the PCI standard. The extended peripheral bus adapter 312, and the algorithm performed by the adapter 312, will be described below in the PCI context. However, one of ordinary skill in the art will understand that other peripheral bus architectures may be used without departing from the spirit and scope of the present invention.

To effectuate resource aggregation of the secondary agent 304 with the additional signals sent/received through the aggregations pins 406, the secondary agent 304 in the preferred embodiment is hidden from third parties, such as the host processor 316. This prevents the operating system from attempting to load a driver to directly control the secondary agent 304. Both the primary agent 314 and the secondary agent 304 have Configuration Registers which define their Configuration Address Spaces. The Configuration Address Space is a set of registers used for configuration initialization and catastrophic error handling. Because the secondary agent 304 is hidden from third parties, the Configuration Registers of the secondary agent 304 are accessible only by the primary agent 314. This renders the secondary agent 304 invisible to the device scans performed by the host bridge 302, while allowing the primary agent 314 to map the secondary agent 304 onto a subset of its own portion of the system address map.

Figure 5:
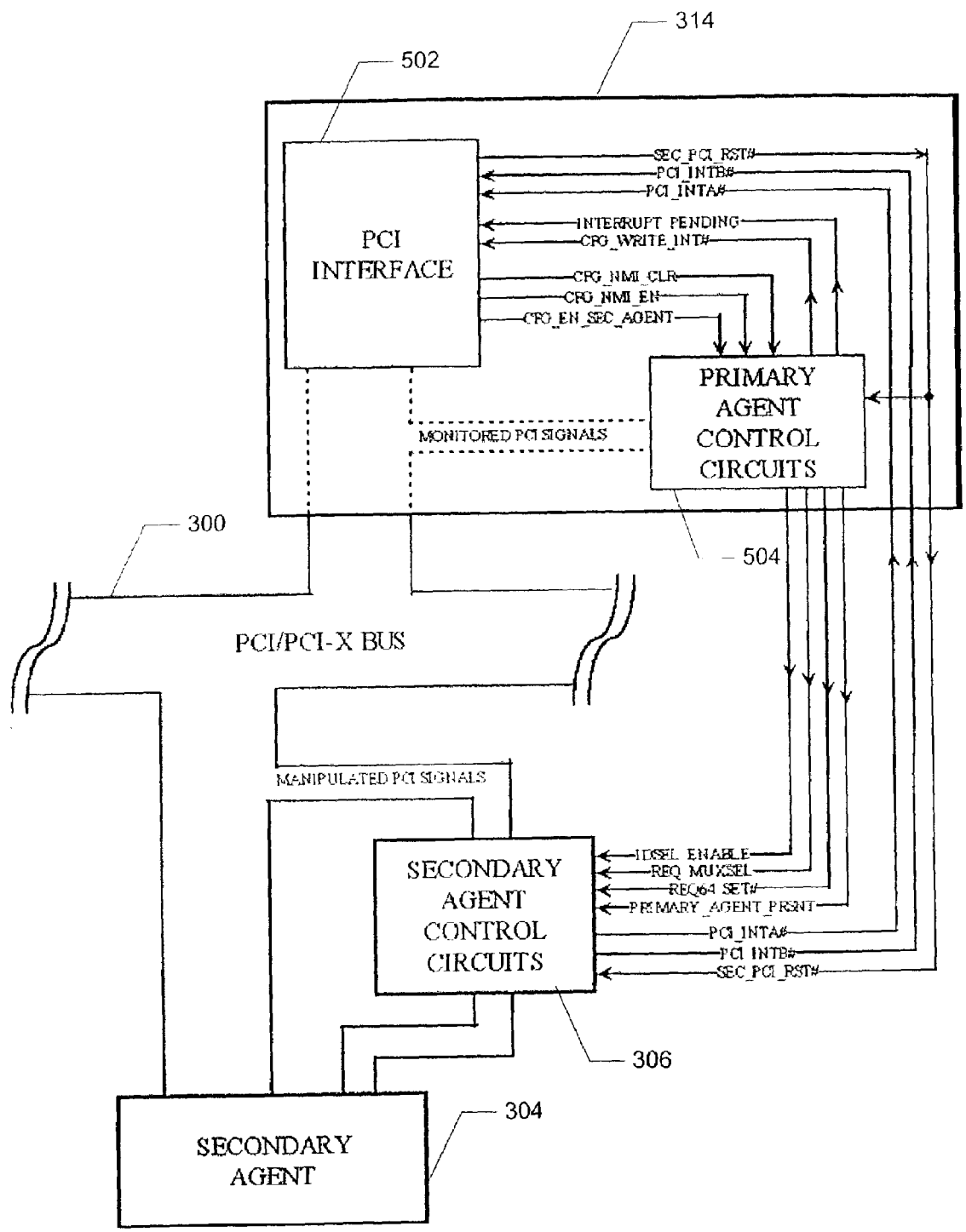
FIG. 5 illustrates a preferred embodiment of the algorithm that allows the primary agent to aggregate the resources of the secondary agent in accordance with the present invention.

FIG. 5 illustrates a preferred embodiment of the algorithm that allows the primary agent to aggregate the resources of the secondary agent in accordance with the present invention. In the preferred embodiment, the primary agent 314 comprises a peripheral bus interface 502 and primary agent control circuits 504. In resource aggregation, several major services are provided by the algorithm in accordance with the present invention.

Major Services

In the preferred embodiment, the major services provided in accordance with the present invention comprises:

PRIMARY AGENT CONFIGURATION WRITE NOTIFICATION: When the primary agent control circuits 504 detects a Configuration Write performed to the Configuration Registers of the primary agent 314, the primary agent control circuits 504 promptly notifies the primary agent 314. The primary agent 314 can then respond accordingly. As would be understood by one of ordinary skill in the art, other methods of detecting the configuration Write is possible without departing from the spirit and scope of the present invention.

SECONDARY AGENT CONFIGURATION: When a Configuration Write is performed to the primary agent 314, it is important that the primary agent 314 reflects the changes to its Configuration Registers in the secondary agent 304. The secondary agent 304 may have been programmed to initiate bus master cycles to addresses corresponding to the Configuration Address Space of the primary agent 314. Unless the secondary agent 304 is quickly prevented from becoming a bus master by the primary agent 314 when the Configuration Registers of the primary agent 314 is changed, the secondary agent 304 may inadvertently write to an unclaimed region or access some unintended device.

RESETTING THE SECONDARY AGENT: If a Configuration Space change affects the primary agent's system memory space, thereby staling the secondary agent's prior resources, the secondary agent resources must be cleaned or flushed. Since the primary agent 314 is the only device on the bus 300 that is aware of the existence of the secondary agent 304, the primary agent 314 is responsible for resetting the secondary agent 304. The primary agent 314 is able to reset the secondary agent 304 without needing to reset the bus 300 or itself.

SECONDARY AGENT INTERRUPT STEERING: Since the primary agent 314 is the only device on the bus 300 that is aware of the existence of the secondary agent 304, the primary agent 314 services the secondary agent's interrupts. Thus, the secondary agent's interrupt outputs are rerouted from the system interrupt controller (not shown) to the primary agent 314.

INTERLOCKED PROTOCOL PROTECTION: When the Configuration Registers of the primary agent 314 is being changed, access to the bus 300 by the secondary agent 304 is blocked. If access by the secondary agent 304 is not blocked, and the secondary agent 304 is reset while the Configuration Registers of the primary agent 314 are being changed, then the secondary agent 304 will likely "float" its signal on the bus 300. This could cause a parity error or system error condition and hang the system. The secondary agent control circuits 306 thus blocks any signals to the secondary agent 304 which grants bus access or signals from the secondary agent 304 requesting bus access. The blocking of these signals also prevents the secondary agent 304 from writing to the primary agent 314 while its Configuration Registers are being changed.

To provide these major services, as well as other services, certain PCI signals are monitored by the primary agent control circuits 504, and certain PCI signals are interrupted and/or manipulated by the secondary agent control circuits 306. Also, signals additional to the PCI signals are generated by the primary agent peripheral bus interface 502 and the primary agent control circuits 504, and signals additional to the PCI signals are received by the secondary agent control circuits 306 through the aggregation pins 410. These signals are described below.

Signals Generated by Primary Agents Interface

The following signals are generated by the primary agent's interface 502 in accordance with the present invention:

CFG_EN_SEC_AGENT: This signal indicates that the primary agent 314 wishes to enable access to the secondary agent's Configuration Registers to perform any necessary changes. If the primary agent's Configuration Registers have been changed, the secondary agent's Configuration Registers may also need to be changed. Since the secondary agent 304 is hidden from third parties, the primary agent 314 is responsible for changing the secondary agent's Configuration Registers.

CFG_NMI_EN: This signal indicates that the primary agent 314 is ready to receive an interrupt notification for writes to the primary agent's Configuration Registers. The interrupt prevents the secondary agent 304 from placing requests onto the bus 300 until the primary agent 314 has performed any necessary changes to its Configuration Registers necessary due to the changes to the primary agent's Configuration Registers.

CFG_NMI_CLR: This signal indicates that the write(s) to the primary agent's Configuration Registers has been handled cleanly, permitting the deassertion of the interrupt signal. With the deassertion of the interrupt signal, the secondary agent 304 is again free to access the bus 300.

SEC_PCI_RST#: This signal is used to generate the appropriate reset timing to the secondary agent 304. The RST# signal is used to bring PCI-specific registers, sequences, and signals to a consistent state. In the preferred embodiment, the secondary agent 304 is reset exclusively by the primary agent 314.

In the preferred embodiment, the signals CFG_EN_SEC_AGENT, CFG_NMI_EN, and CFG_NMI_CLR are generated by the interface 502 and provided to the primary agent control circuits 502, while the SEC_PCI_RST# signal is generated by the interface 502 and provided directly to the secondary agent control circuit 306. Alternatively, the SEC_PCI_RST# signal can be generated by the primary agent control circuits 504.

Signals to Primary Agent Monitored by Primary Agent Control Circuits

To detect the configuration writes to the primary agent 314, as well as bus ownership, the following PCI signals to the primary agent 314 are monitored by the primary agent control circuits 504 in accordance with the present invention:

CLK: This Clock signal provides timing for all transactions on the bus 300 and is an input to every device on the bus 300.

FRAME#: This Cycle Frame signal is driven by the current bus master to indicate the beginning and duration of a bus access. The FRAME# signal is asserted to indicate a bus transaction is beginning. When the FRAME# signal is deasserted, the transaction is in the final data phase or has completed.

IRDY#: This Initiator Ready signal indicates the initiating agent's (bus master's) ability to complete the current phase of the transaction.

TRDY#: This Target Ready signal indicates the target agent's (selected device's) ability to complete the current data phase of the transaction.

GNT#: This Grant signal indicates to the requesting agent that access to the bus 300 has been granted. Every master has its own GNT# signal which must be ignored while the RST# signal is asserted.

RST#: This Reset signal is used to bring PCI-specific registers, sequences, and signals to a consistent state.

IDSEL: This Initialization Device select signal is used as a chip select during configuration read and write transactions.

C_BE[0:3]#: This Bus Command and Byte Enable signals are multiplexed in the same pin of the peripheral bus connector 308. The Bus Command signal indicates to the target the type of transaction the master is requesting. The Byte Enable signal indicates which byte lanes carry meaningful data.

Signals Received by Primary Agents Interface

The following output signals are received by the interface 502 in accordance with the present invention:

INTERRUPT_PENDING: This signal indicates to the primary agent 314 that a write is being performed to its Configuration Registers.

CFG_WRITE_INT#: This signal is the actual interrupt signal to the primary agent 314. If CFG_NMI_EN is asserted by the primary agent 314, this interrupt signal will assert when INTERRUPT_PENDING asserts.

Signals Received by Secondary Agent Control Circuits

The following output signals are received by the secondary agent control circuits 306 colocated with the secondary agent 304 in accordance with the present invention:

IDSEL_ENABLE: This signal is asserted when the primary agent 314 is the bus master and the CFG_EN SEC_AGENT signal is asserted.

REQ64_SET#: In some applications, the devices on the bus 300 operate in the 64-bit mode. According to the PCI standard, the REQ64# signal is asserted during a reset of the system to indicate to the devices on the bus 300 that they are to operate in the 64-bit mode. The REQ64# signal is asserted for a small window of time. However, since the secondary agent 304 is controlled by the primary agent 314 according to the present invention, there may be a delay between the assertion of the REQ64# signal and the time at which the secondary agent 304 is able to received the signal. If the delay is such that the secondary agent 304 does not receive the REQ64# signal, then the secondary agent 304 will only operate in the 32-bit mode. Thus, the primary agent 314 asserts the REQ64_SET# signal during the time of the possible delay to ensure that the secondary agent 304 is appropriately set to operate in the 64-bit mode.

REQ_MUXSEL: This signal selects one of two possible states for a first multiplexer (not shown) in the secondary agent control circuits 306. A first state of the first multiplexer allows the standard PCI signals to pass. The first state is selected when the primary agent 314 is not installed. If the primary agent 314 is installed, a second state of the first multiplexer is selected, which blocks the REQ64_SET#, REQ#, and GNT# signals from reaching the secondary agent 304 until the primary agent 314 can take control of the secondary agent 304. The REQ# signal indicates to the arbiter that the secondary agent 304 desires use of the bus 300. The GNT# signal indicates to the secondary agent 304 that access to the bus 300 has been granted.

PRIMARY_AGENT_PRSNT: This signal indicates that the primary agent 314 is physically installed in the connector 308.

Signals Intercepted and/or Manipulated by Secondary Agent Control Circuits

In the preferred embodiment, the following PCI signals to the secondary agent 306 are intercepted and/or manipulated by the secondary agent control circuits 306, as described further below:

INTA#: This Interrupt A signal is used for the secondary agent 306 to request an interrupt.

INTB#: This Interrupt B signal is used to request an interrupt and only has meaning in a multi-function device.

RST#: This Reset signal is used to bring the PCI-specific registers of the secondary agent 304 to a consistent state.

The INTA#, INTB#, and RST# signals are input into a second multiplexer (not shown) in the secondary agent control circuits 306. The first state of the second multiplexer allows the INTA#, INTB#, and RST# signals to pass directly to the secondary agent 304 and is selected when the primary agent 314 is not installed. When the primary agent 314 is installed, the second state of the second multiplexer is selected, which routes these signals to the primary agent 314. This routing is required since the secondary agent 304 is hidden to third parties according to the present invention. Thus, the primary agent 314 services the interrupts of the secondary agent 304.

IDSEL: This ID Select signal is input into a third multiplexer (not shown) in the secondary agent control circuits 306. The first state of the third multiplexer allows the IDSEL signal to pass directly to the secondary agent 304 and is selected when the primary agent 314 is either not installed or wants to configure the Configuration Registers of the secondary agent 304. The second state of the third multiplexer blocks the IDSEL signal from reaching the secondary agent 304 and is selected when the primary agent 314 wants to hide the secondary agent 304 during scans of the bus 300 by the host bridge 302.

REQ#: This Request signal indicates to the arbiter that the secondary agent 304 desires use of the bus 300.

GNT#: This Grant signal indicates to the secondary agent 304 that access to the bus 300 has been granted.

REQ64#: This Request 64-bit Mode signal indicates to a device on the bus 300 that the device is to operate in the 64-bit transfer mode.

The REQ#, GNT#, and REQ64# signals are input into the first multiplexer and manipulated as described above in relation to the REQ_MUXSEL signal.

Major Services and Signals

The major services provided in accordance with the present invention are hereby described further in the context of the above described signals:

PRIMARY AGENT PCI CONFIGURATION WRITE NOTIFICATION: The PCI signals listed above are monitored by the primary agent control circuits 504, which drives the CFG_WRITE_INT# to the primary agent 314 when a Configuration Write is performed to the primary agent 314. The CFG_WRITE_INT# signal promptly notifies the primary agent 314 of changes to its Configuration Registers. The CFG_NMI_CLR signal provides a positive handshake back to the primary agent control circuits 504 to indicate that any changes to the secondary agent's Configuration Registers, made in response to the Configuration Write to the primary agent's Configuration Registers, has been performed.

SECONDARY AGENT CONFIGURATION BY PRIMARY AGENT: The primary agent control circuits 504 monitors the PCI input signals listed above to see when the primary agent 314 is the bus master. When it detects that the primary agent 314 is the bus master and that the CFG_EN_SEC_AGENT signal is asserted, it will assert the IDSEL_ENABLE signal. This signal is received by the secondary agent control circuits 306, which manipulate the secondary agent's IDSEL input such that the IDSEL_ENABLE signal is blocked until the primary agent 314 has control of the PCI bus 300. The primary agent 314 then configures the secondary agent 304.

RESETTING THE SECONDARY AGENT: The primary agent control circuits 504 monitors the SEC_PCI_RST# signal and drives the REQ64_SET# and REQ_MUXSEL signals to reset the secondary agent 304 and to ensure that the secondary agent 304 operates in the 64-bit mode when appropriate. The primary agent 314 is thus able to reset the secondary agent 304 without needing to reset the bus 300 or itself.

SECONDARY AGENT INTERRUPT STEERING: The secondary agent's interrupt outputs, signals INTA# and INTB#, are rerouted from the system interrupt controller (not shown) to the primary agent 314 so that the primary agent 314 can service the secondary agent's interrupts.

INTERLOCKED PROTOCOL PROTECTION: An important function of the REQ64_MUXSEL signal is to block the GNT# and CFG_NMI_CLR signals to the secondary agent 304 during the time between the assertion of the CFG_WRITE_INT# signal and assertion of the CFG NMI_CLR signal when the Configuration Registers of the primary agent 314 is being changed. This is important because when the CFG_WRITE_INT# signal is asserted to the primary agent 314, the secondary agent 304 could be on the bus 300 on the next cycle. If the primary agent 314 drives the SEC_PCI_RST# signal as a result of the interrupt, the secondary agent 304 will likely "float" its signal on the bus 300. This could cause a parity error or system error condition and hang the system. By blocking the GNT# and REQ# signal and waiting for the CFG_NMI_CLR signal from the primary agent 314, the error conditions are avoided.

The blocking of the REQ# and GNT# signals during this interrupt time window provides another protection when the secondary agent 304 has not yet been reset, but is trying to take bus ownership to perform a write to the primary agent 314. If the primary agent's address map has been changed, the secondary agent 304 could be writing to an address that is unclaimed or occupied by a device other than the primary agent 314. The blocking of the GNT# signal to the secondary agent 304 effectively prevents it from taking bus ownership. However, if the secondary agent 304 continuously asserts its REQ# signal to request bus ownership and the bus arbiter grants ownership by asserting the GNT# signal to it, the secondary agent 304 will not be aware of its bus ownership. If the secondary agent 304 continues to fail to assert the FRAME# signal, the arbiter may erroneously assume that the secondary agent 304 is malfunctioning. The blocking of the REQ# signal from the secondary agent 304 during this time window effectively deasserts its respective REQ# signal at the bus arbiter, preventing these errors from occurring.

Although the present invention is described above in the context of the PCI bus architecture and with the above described signals, one of ordinary skill in the art will understand that other bus architectures and/or other signals may be used without departing from the spirit and scope of the present invention.

An improved method and apparatus for aggregation of resources across a peripheral bus has been disclosed. The peripheral bus connector in accordance with the present invention comprises a plurality of aggregation pins, in addition to the pins according to the peripheral bus standard. Signals from a controller on an extended peripheral bus adapter sends and receives signals in addition to standard signals of the peripheral bus through the aggregation pins for the purpose of aggregating the resources of an aggregated device on the bus. In the preferred embodiment, the aggregated device is hidden from third parties, and its existence is known only to the controller on the extended peripheral bus adapter. In this manner, resources are aggregated across a peripheral bus without needing the addition of another controller and without the need to redefine standard peripheral bus signals. In addition, standard peripheral bus adapters may still be used in the connector if resource aggregation is not desired.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An extended peripheral bus adapter, comprising:
   a primary agent for controlling an aggregation of resources of a secondary agent on the peripheral bus; and
   a connection capable of coupling with a peripheral bus connector, wherein the peripheral bus connector comprises a plurality of standard pins and a plurality of aggregation pins, wherein a plurality of standard signals for controlling the aggregation of resources can be communicated between the peripheral bus and the primary agent through the plurality of standard pins, wherein a plurality of non-standard signals for controlling the aggregation of resources can be communicated between the peripheral bus and the primary agent through the plurality of aggregation pins.

2. The adapter of claim 1, wherein the primary agent comprises:
   a peripheral bus interface; and
   a primary agent control circuits.

3. The adapter of claim 1, wherein the secondary agent is hidden from third parties on the peripheral bus.

4. The adapter of claim 1, wherein the plurality of standard and non-standard signals provides a plurality of services.

5. The adapter of claim 4, wherein the plurality of services comprises a notification of changes to a plurality of configuration registers of the primary agent.

6. The adapter of claim 4, wherein the plurality of services comprises a configuration of the secondary agent by the primary agent.

7. The adapter of claim 4, wherein the plurality of services comprises a resetting of the secondary agent by the primary agent.

8. The adapter of claim 7, wherein the plurality of services comprises the servicing of interrupts of the secondary agent by the primary agent.

9. An extended peripheral bus adapter, comprising:
   a primary agent for controlling an aggregation of resources of a secondary agent on the peripheral bus; and
   a connection capable of coupling with a peripheral bus connector, wherein the peripheral bus connector comprises a plurality of aggregation pins, wherein a plurality of signals for controlling the aggregation of resources can be communicated between the peripheral bus and the primary agent through the peripheral bus connector, wherein the plurality of signals provides an interlocked protocol protection.

10. An extended peripheral bus adapter, comprising:
    a primary agent for controlling an aggregation of resources of a secondary agent on the peripheral bus; and
    a connection capable of coupling with a peripheral bus connector, wherein the peripheral bus connector comprises a plurality of standard pins and a plurality of aggregation pins, wherein a set of standard signals for the peripheral bus for controlling the aggregation of resources can be communicated between the primary agent and the peripheral bus through the plurality of standard pins, wherein a set of non-standard signals for the peripheral bus for controlling the aggregation of resources can be communicated between the primary agent and the peripheral bus through the plurality of aggregation pins.

11. A system, comprising:
    a peripheral bus;
    a secondary agent on the peripheral bus; and
    a peripheral bus connector, comprising a plurality of standard pins and a plurality of aggregation pins,
    wherein an extended peripheral adapter is capable of coupling with the peripheral bus connector,
    wherein the extended peripheral adapter comprises a primary agent for controlling an aggregation of resources of the secondary agent,
    wherein a set of standard signals for the peripheral bus for controlling the aggregation of resources can be communicated between the primary agent and the peripheral bus through the plurality of standard pins, and
    wherein a set of non-standard signals for the peripheral bus for controlling the aggregation of resources can be communicated between the primary agent and the peripheral bus through the plurality of aggregation pins.

12. The system of claim 11, wherein the secondary agent is hidden from third parties on the peripheral bus.

13. The system of claim 11, wherein the sets of signals provide a plurality of services.

14. The system of claim 13, wherein the plurality of services comprises a notification of changes to a plurality of configuration registers of the primary agent.

15. The system of claim 13, wherein the plurality of services comprises a configuration of the secondary agent by the primary agent.

16. The system of claim 13, wherein the plurality of services comprises a resetting of the secondary agent by the primary agent.

17. The system of claim 16, wherein the plurality of services comprises the servicing of interrupts of the secondary agent by the primary agent.

18. The system of claim 13, wherein the plurality of services comprises an interlocked protocol protection.

* * * * *